United States Patent
Elliott

(10) Patent No.: US 12,132,707 B2
(45) Date of Patent: Oct. 29, 2024

(54) HOST FIREWALL INTERFACES FOR CONTROLLERS

(71) Applicant: HEWLETT PACKARD ENTERPRISE DEVELOPMENT LP, Houston, TX (US)

(72) Inventor: Robert C. Elliott, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 543 days.

(21) Appl. No.: 17/304,957

(22) Filed: Jun. 29, 2021

(65) Prior Publication Data
US 2022/0417216 A1    Dec. 29, 2022

(51) Int. Cl.
*H04L 9/40*       (2022.01)
*G06F 13/42*      (2006.01)

(52) U.S. Cl.
CPC ...... *H04L 63/0263* (2013.01); *G06F 13/4282* (2013.01); *G06F 2213/0026* (2013.01)

(58) Field of Classification Search
CPC .... G06F 3/0622; G06F 3/0655; G06F 3/0673; G06F 13/4282; G06F 2213/0026; H04L 63/0263
See application file for complete search history.

(56) References Cited

U.S. PATENT DOCUMENTS

| | | | |
|---|---|---|---|
| 9,043,872 B2 | 5/2015 | Lambert et al. | |
| 9,811,654 B2 | 11/2017 | Patel et al. | |
| 10,866,747 B2 | 12/2020 | Som et al. | |
| 2004/0003290 A1* | 1/2004 | Malcolm | H04L 63/0263 726/28 |
| 2004/0039941 A1* | 2/2004 | Schmidt | H04L 45/60 726/13 |
| 2010/0180331 A1* | 7/2010 | Murakami | G06F 21/55 726/11 |
| 2018/0007005 A1* | 1/2018 | Chanda | H04L 63/0236 |
| 2019/0268376 A1* | 8/2019 | Park | H04L 63/0428 |
| 2021/0377068 A1* | 12/2021 | Mayer | H04L 12/40045 |

FOREIGN PATENT DOCUMENTS

CN        107145788        9/2017

OTHER PUBLICATIONS

Intel Platform Environment Control Interface (PECI), "PECI device driver introduction", available online at <https://lwn.net/Articles/747727/>, 2018, 3 pages.
Intel, "Enhanced Serial Peripheral Interface (eSPI)", Interface Base Specification (for Client and Server Platforms), Revision 1.0, Jan. 2016, 130 pages.
Intel, "Intel® Low Pin Count (LPC)", Interface Specification, Revision 1.1 , Aug. 2002, 54 pages.

* cited by examiner

*Primary Examiner* — Abu S Sholeman
(74) *Attorney, Agent, or Firm* — Trop, Pruner & Hu, P.C.

(57) ABSTRACT

A non-transitory machine-readable storage medium stores instructions that, when executed by the machine, cause the machine to provide a firewall interface between a plurality of registers of a controller and a host interface of the controller. Providing the firewall interface includes programming the firewall interface with a plurality of firewall rules. The registers are to control functions that are performed by the controller; and the plurality of firewall rules control whether requests to access the plurality of registers are denied, allowed or modified based on features of the request.

15 Claims, 7 Drawing Sheets

HOST FIREWALL INTERFACES FOR CONTROLLERS

BACKGROUND

A computer system may include a number of controllers that add functionality to the system's host. As an example of a controller, the computer system may include a network interface controller to connect the host to one or multiple networks. As another example of a controller, the computer system may include a storage controller to connect the host to storage resources. As another example of a controller, the computer system may include a baseboard management controller (BMC) to, among its other functions, monitor the physical state of the computer system and communicate with a remote management server for purposes of managing the computer system.

DETAILED DESCRIPTION

Figure 1:
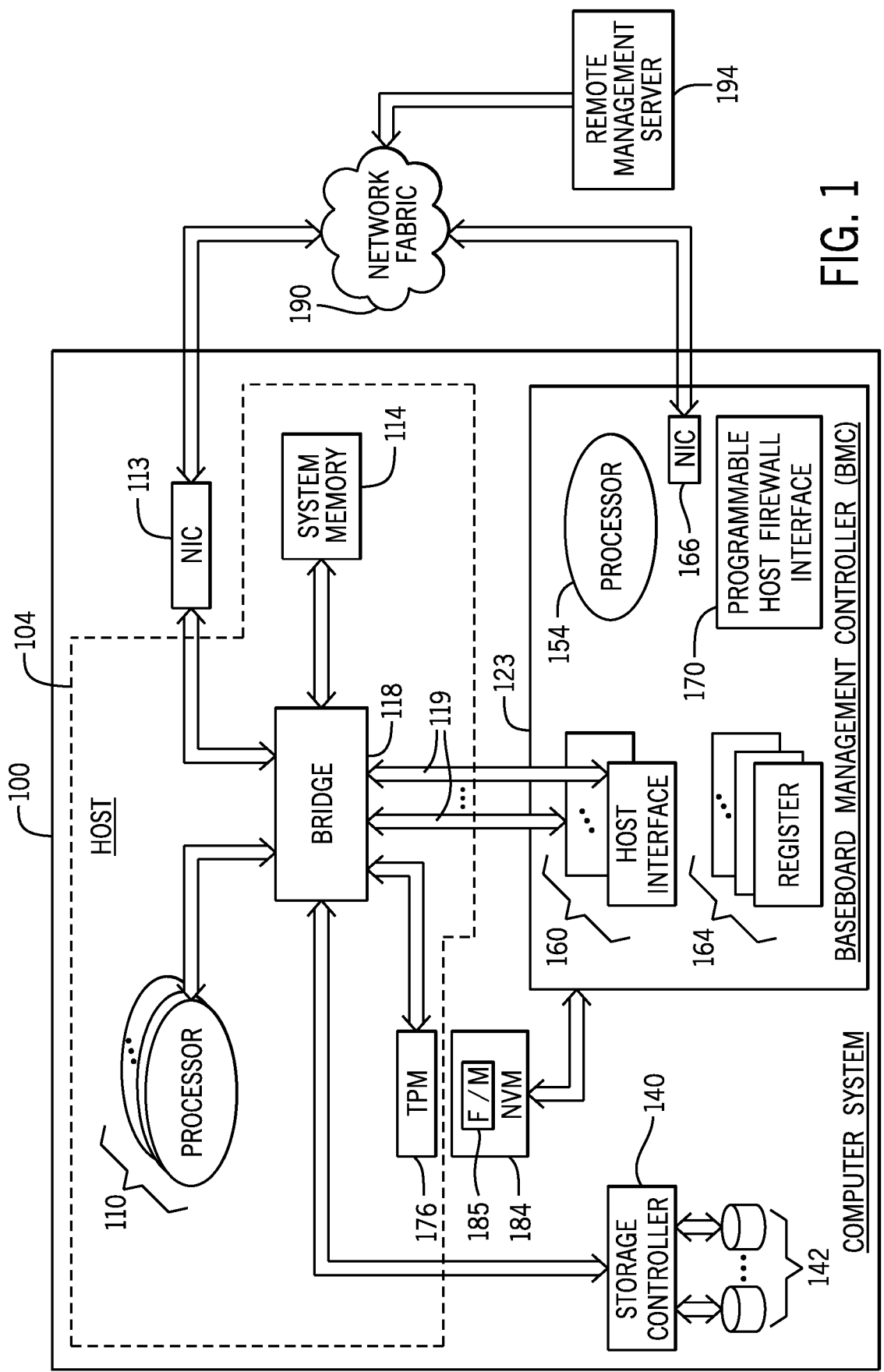
FIG. 1 is a schematic diagram of a computer system according to an example implementation.

A computer system, such as a server, may have a BMC that provides a number of different management functions for the computer system. The BMC may include one or multiple embedded processing cores that execute a set of firmware instructions, called a "management firmware stack." Some management functions of the BMC, as well as functions of the computer system's host, may be controlled and monitored by writing and reading registers (herein called "BMC registers") of the BMC.

In general, the BMC registers may be contained within one or multiple address spaces of the computer system, such as a memory space, an input/output (I/O) space, a configuration space and/or a message space. Without adequate access control measures in place, the BMC registers and the associated management functions may be accessed by unauthorized host devices. For example, if the computer system is exposed to an untrusted tenant as a bare-metal instance without a hypervisor, then the tenant software may potentially access important BMC registers. A rogue tenant may, for example, access a particular BMC register to perform or initiate an important management function (e.g., the rogue tenant may power down the server).

One approach to control host access to the BMC registers is to implement hardware restrictions in the BMC to limit access for certain BMC registers and/or register fields. This hardware-centric approach involves determining, during the design of the BMC's hardware, whether host access to a given BMC register or register field is safe or unsafe. Such an approach is "hardened" in nature, as it may be quite challenging to modify (e.g., add, remove, further restrict, and so forth) host access to a given register or register field post BMC hardware fabrication. As such, it may be challenging to remedy oversights or mistakes in judgment made in the BMC's register access policy without re-spinning (i.e., rebuilding including redesigning and refabricating) the BMC hardware and thereby incurring significant monetary and human resource costs.

In accordance with example implementations that are described herein, a controller, such as a BMC, contains a programmable host firewall interface. The programmable host firewall interface may be programmed by a processor (e.g., an embedded management processor core) of the controller with firewall rules that control host access to the registers of the controller. More specifically, in accordance with example implementations, an embedded management processing core of a BMC may execute machine-executable instructions (i.e., "software") during the boot of a computer system to program the programmable host firewall interface with firewall rules that control host access to the BMC's registers. With this approach, the BMC register access control policy is "soft" in nature, as firewall rules may be added, deleted and/or modified by the embedded management processing core post BMC fabrication. Accordingly, without re-spinning BMC hardware, the BMC may be adapted and re-adapted to accommodate rethinking of permitted and not permitted BMC register accesses; and the BMC may be adapted and re-adapted to accommodate different host environments.

In accordance with example implementations, an embedded management processing core of the BMC executes validated firmware (e.g., validated firmware corresponding to the management firmware stack of the BMC) to program the BMC's programmable host firewall interface with the firewall rules. In general, as further described herein, the programmable host firewall interface may perform host request-to-firewall rule matching to identify one or multiple firewall rule matches, or "hits" for a given host request. When, based on this matching, one or multiple firewall rules are identified for a given host request, the programmable host firewall interface applies the action(s) that are set forth in the rule(s) to regulate the BMC's processing of the host request. As further described herein, an "action" may refer to the request being denied, allowed or modified.

In general, the programmable host firewall interface is part of a host firewall interface of a controller. In this context, a "host firewall interface" refers to a layer of security that controls host access to the controller. In accordance with example implementations, the host firewall interface includes a programmable host firewall interface and programmable data that defines firewall rules that are applied by the programmable host firewall interface. A "firewall rule," in general, defines one or multiple matching criteria for identifying a particular host request, and the firewall rule sets forth a directive or regulation, which governs how (i.e., an action) the programmable host firewall interface processes the identified host request.

Referring to FIG. 1, as a more specific example, in accordance with some implementations, a computer system 100 (e.g., a "server") includes a host 104 and a controller, such as a BMC 123, that may be accessed by the host 104. In this context, a "host" refers to a part of a computer system, which provides one or multiple operating system instances for the computer system. The host may be a physical host (e.g., a host containing general purpose central processing units (CPUs) that execute operating system (OS) instructions) or a virtual host (e.g., a guest virtual machine having a virtual OS created by the CPUs executing hypervisor instructions). A "controller," in the context herein, refers to a peripheral of a computer system, which provides one or multiple functions for the host. The BMC 123, a storage controller 140 (that controls mass storage devices 142) and a network interface controller 113 of the computer system 100 are all examples of "controllers."

The BMC 123 contains registers 164. The host 104 may access (or attempt to access) a register 164 by providing a request (also called a "host request" herein). In this context, accessing a register 164 refers to either accessing the entire register or accessing a part (or "field") of the register 164. The host request may be in the form of a packet that is communicated over a bus 119 (e.g., a Peripheral Component Interconnect express (PCIe) interface bus, a Serial Peripheral Interface (SPI) bus, an enhanced SPI (eSPI) bus, a Low Pin Count (LPC) bus, or a bus associated with another bus standard) of the computer system 100; and the host request is received by a corresponding host interface 160 of the BMC 123.

The host request may target a register 164 that is within a particular address space of the computer system 100. The computer system 100 may have multiple address spaces, and the bus standard of the bus 119 over which the host request is communicated may control which address spaces may be accessed. As an example, the PCIe interface supports four address spaces: a memory space; I/O space; a configuration space, which is accessed indirectly or directly via memory space or I/O space; and a message space. As another example, the eSPI interface supports the memory space and I/O space address spaces. Therefore, a host request that is communicated over a PCIe interface may potentially access memory space, I/O space, configuration space, and message space; and a host request that is communicated over an eSPI interface may potentially access memory space and I/O space.

Although controlling BMC register access for "host requests" is specifically discussed herein, an embedded management processing core (represented by a processor 154 and also referred to as the "BMC processor 154" or "processor 154" herein) may also submit requests to access the registers 164.

In accordance with example implementations, one or multiple controllers of the computer system 100 may include a programmable host firewall interface (also called a "firewall" herein) to control host access to registers of each of the controllers. For the specific example implementation that is described herein, the BMC 123 includes a programmable host firewall interface 170. Although, in accordance with example implementations, the programmable host firewall interface 170 may be a hardware-based device (e.g., a device implemented using combinatorial logic), firewall rules that are used by the interface 170 may be defined by the execution of machine-executable instructions, or "software." In this manner, as described herein, the BMC processor 154 may execute machine-executable instructions to modify, add and/or delete firewall rules, which, in turn, control actions that the programmable host firewall interface 170 takes when processing host requests that are directed to the BMC registers 164. In other words, the BMC processor 154 may, post fabrication of the programmable host firewall interface 170 (and BMC 123), modify, add and/or delete firewall rules to correspondingly change host access to the BMC registers 164.

In accordance with example implementations, the machine-executable instructions that are executed to modify, add and/or delete the firewall rules may be firmware 185 (stored in a non-volatile memory 184) that is validated by the BMC's security plane before being loaded for execution by the BMC processor 154. Because the firewall rules may be changed by merely changing a firmware image, host access to the BMC registers 164 may be changed without re-spinning hardware of the BMC 123. This adaptability may be advantageous for addressing later discovered security exposures, adapting the BMC 123 for use in future server architectures and applications, and so forth.

For the example implementation that is depicted in FIG. 1, the host 104 includes one or multiple general purpose processors 110 (e.g., one or multiple CPUs, one or multiple CPU processing cores, one or multiple GPU cores, one or multiple FPGAs, and so forth); a system memory 114; and a bus infrastructure. In accordance with example implementations, the system memory 114 and other memories that are discussed herein are non-transitory storage media that may be formed from semiconductor storage devices, memristor-based storage devices, magnetic storage devices, phase change memory devices, a combination of devices of one or more of these storage technologies, and so forth. The system memory 114 may represent a collection of both volatile memory devices and non-volatile memory devices.

In accordance with example implementations, the bus infrastructure of the host 104 may include one or multiple bridges 118 that may be connected to the system memory 114, the storage controller 140, the network interface controller 113; the BMC 123; a Trusted Platform Module (TPM) 176; one or multiple I/O device interfaces; and so forth. The bridge(s) 118 route host requests (e.g., host requests that are generated by the processor(s) 110) to one or multiple buses 119 (e.g., an eSPI bus, an LPC bus, a PCIe bus, an SPI bus, or a combination of these or other buses) that are connected to the BMC 123.

In accordance with some implementations, the processor 110 may include one or multiple semiconductor packages (or "chips"), and processor 110 may include a north bridge 118 that includes a memory controller 118 (for system memory 114 accesses) and PCIe root ports. The host 104 may also include a south bridge 118 that provides I/O ports, such as Serial Advanced Technology Attachment (SATA) ports, Universal Serial Bus (USB) ports, LPC ports, SPI ports, eSPI ports and so forth. In accordance with some implementations, the north bridge 118 may be part of the processor 110. In accordance with further implementations, the north and south bridges may be combined into a single bridge 118; and in accordance with some implementations, this single bridge 118 may be part of the processor 110.

For the example implementation of FIG. 1, the BMC 123 includes a network interface controller 166 to communicate with a remote management server 194 via network fabric 190. In general, the network fabric 190 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

In accordance with example implementations, the BMC 123 may be an embedded system that is mounted to a motherboard, or the BMC 123 may be an expansion card that is connected to a motherboard connector slot. Depending on the particular implementation, the BMC 123 may contain one or multiple semiconductor packages (or "chips") and one or multiple semiconductor die. The BMC 123 may not contain semiconductor package(s) mounted to the motherboard or may not be located on an expansion card, in accordance with further implementations.

In general, as used herein, a BMC is a specialized service processor that monitors the physical state of a server, node, or other hardware entity using sensors and communicates with a management system through a management network. The BMC may communicate with applications executing at the operating system level through an input/output controller (IOCTL) interface driver, a representational state transfer (REST) application program interface (API), or some other system software proxy that facilitates communication between the BMC and applications. The BMC may have hardware level access to hardware devices of the hardware entity, including a system memory, local memories, and so forth. The BMC may be able to directly modify the hardware devices. The BMC may operate independently of any operating system instances of the hardware entity. The BMC may be located on a motherboard or main circuit board of the hardware entity. The fact that the BMC is mounted on the motherboard or otherwise connected or attached to the motherboard does not prevent the BMC from being considered "separate" from the processors, which are being monitored/managed by the BMC. As used herein, a BMC has management capabilities for sub-systems of the hardware entity, and is separate from a processing resource that executes an operating system of the computing device.

Figure 2:
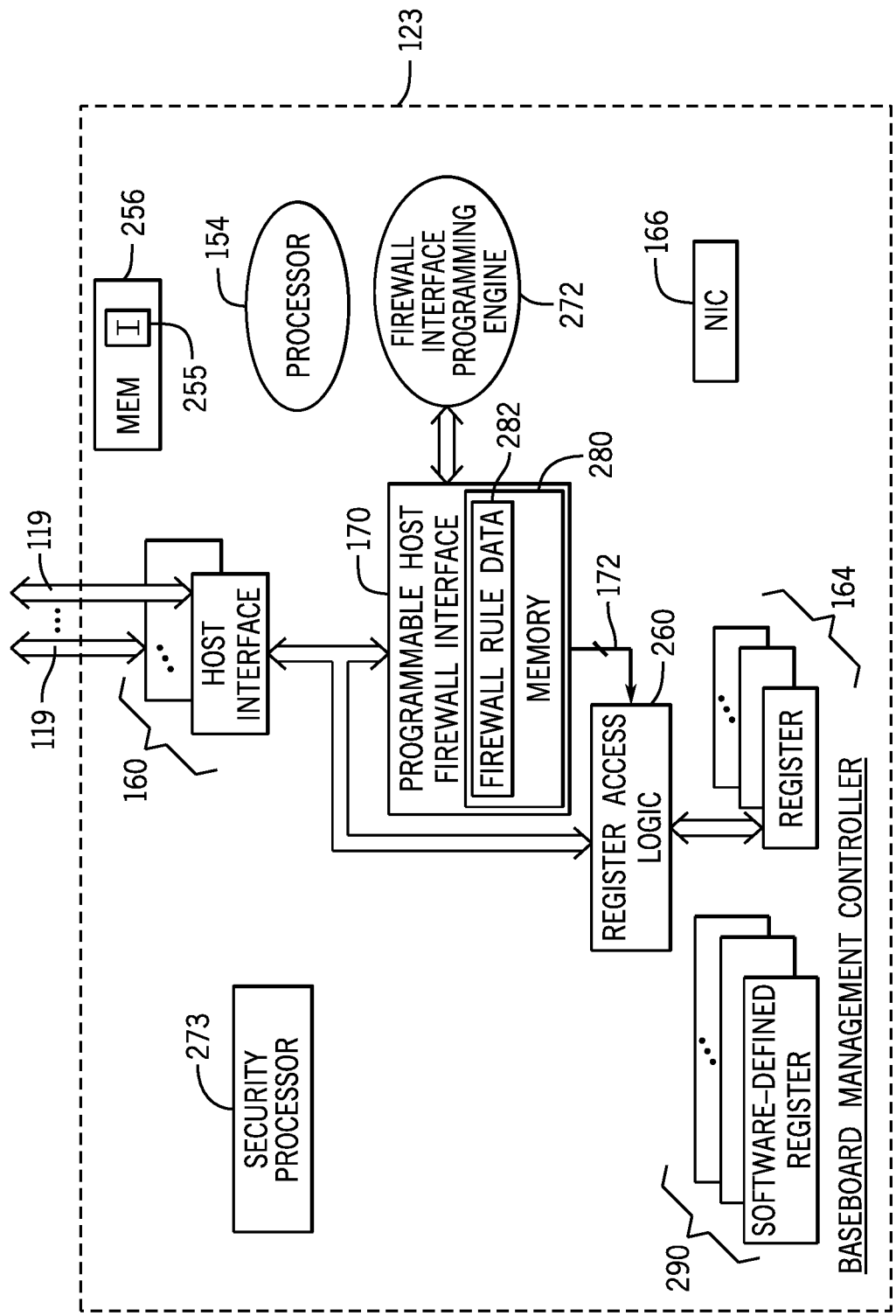
FIG. 2 is a schematic diagram of a BMC of the computer system of FIG. 1 according to an example implementation.

Referring to FIG. 2 in conjunction with FIG. 1, regardless of the particular form or implementation of the BMC 123, the BMC processor 154 may execute machine-executable instructions (e.g., instructions that are contained in the firmware 185 (FIG. 1)) to provide a firewall interface programming engine 272 for the BMC 123. In general, as further described herein, the firewall interface programming engine 272 is a software entity that programs firewall rule data 282 (which represents the firewall rules) into a memory 280 of the programmable host firewall interface 170 as part of a boot process that is initiated by a power on or reset of the computer system 100.

In accordance with example implementations, the BMC 123 may have a management plane. Through its management plane, the BMC 123 may provide various management services for the computer system 100, such as monitoring sensors (e.g., temperature sensors, cooling fan speed sensors); monitoring an operating system status; monitoring power statuses; controlling power on and power off of the computer system; logging computer system events; allowing remote management of the computer system; performing recovery operations after an operating system or computer system failure; and so forth. Moreover, in accordance with example implementations, through the BMC's management plane, the BMC 123 may program the programmable host firewall interface 170, as described herein. In accordance with some implementations, the BMC 123 may include a security processor 273 that, among other functions, may validate the firmware 185 before the firmware 185 is allowed to be loaded into a memory 256 of the BMC 123 and executed by the BMC processor 154. In accordance with further implementations, the computer system 100 may include a non-BMC-based security solution to validate the firmware 185.

The BMC processor 154 executes firmware instructions from the memory 256 to provide various management services for the BMC 123 as part of the BMC's management plane. As part of the management services, the BMC processor 154 may execute machine-executable instructions 255 that are stored in the memory 256 to provide the firewall interface programming engine 272, i.e., to provide the firewall rule data 282 to establish the firewall rules for the programmable host firewall interface 170.

As described further herein, in accordance with example implementations, the programmable host firewall interface 170, based on features of a host request and the firewall rules, generates one or multiple signals 172 that control actions that are taken by the BMC 123 in processing the host request. For example, in accordance with some implementations, the signal(s) 172 may enable or disable the ability of register access logic 260 (e.g., decode logic, as well as logic to perform certain actions, as directed by the interface 170, as described herein) to perform the action requested by a given host request. Moreover, in accordance with example implementations, the programmable host firewall interface 170 may cause the register access logic 260 to perform actions other than allowing or denying host requests, as further described herein.

As noted above, in accordance with example implementations, host requests are communicated to the BMC 123 in the form of packets (e.g., PCIe packets, eSPI packets, and so forth). In general, a "packet" refers to a unit of data that is communicated to a particular host interface 160 of the BMC 123. More specifically, in accordance with example implementations, the packet may contain data that represents an address of a BMC register 164 or a particular field of a register 164; data representing a command to be performed with the register address (e.g., a write command or a read command); and other data, such as header information, payload data, a source address of the sender, a particular protocol, a source port, a destination port, and so forth.

Depending on the particular implementation, the programmable host firewall interface 170 applies a single matching criterion or multiple matching criteria to determine whether a particular host request matches one or multiple firewall rules. More specifically, in accordance with some implementations, the programmable host firewall interface 170 applies matching criteria to certain features of a host request packet to determine whether a match, or "hit," has occurred. For example, in accordance with some implementations, the programmable host firewall interface 170 may perform the matching based on a four feature tuple: an address space; an address field; an access type; and an access size.

The "address space" refers to the category, or type, of address space being accessed, such as a memory space, an I/O space, a configuration space or a message space. For example, for a PCIe packet, the type field in the packet header contains data that represents the address space being accessed.

The "address field" refers to an identifier for the address space, which specifically identifies the particular BMC register or register field being accessed. For a PCIe packet-based host request that targets memory space or I/O space, the address field is set forth in the address field of the PCIe packet. For a PCIe packet-based host request that targets PCIe configuration space, the address field is set forth in the bus number, device number, function number, extended register number and register number fields of the PCIe packet.

The "access type" refers to whether the host request is a read request or a write request. As described further herein, the access type may be used to implement different policies for reads versus writes. For example, as further described herein, a particular firewall rule may make a read-write register appear to be a read-only register to the host 104. As another example, a particular firewall rule may ignore the access type and apply the same action to all access types.

The "access size" refers to the size of the space being accessed by the host request. In accordance with example implementations, the programmable host firewall interface 170 may use the access size to target host requests to the registers 164. In this manner, in accordance with some implementations, the programmable host firewall interface 170 may recognize that an access size of eight bytes or smaller targets a register 164. Registers may be defined as being four bytes wide (i.e., a double word, or "DWORD"), so that, in accordance with example implementations, the programmable host firewall interface 170 may detect host requests that target registers by detecting access sizes that have a granularity of four bytes; and in accordance with example implementations, the programmable host firewall interface 170 may not subdivide the register space into smaller subfields. In accordance with further implementations, the programmable host firewall interface 170 may detect host requests that target registers 164 or fields of the registers 164 detecting access sizes that have a granularity of four bytes or less.

Matching criteria other than or in addition to address space, address field, access type and access size may be used, in accordance with further implementations.

Some of the registers 164 may be structured as index and data registers, which serve as portals to other registers or banks of registers. In this manner, other registers may be behind a pair of index and data registers, such that the registers behind the pair of index and data registers are accessed via accesses to the pair of index and data registers. The index register stores content, which specifies, or represents, the address of the register behind the pair to be accessed; and accesses to the data register are redirected to the register behind the pair (per the register address that is stored in the index register). A given host request may therefore be, for example, a request to write to the index register and contain write data that specifies a register address, for purposes of setting up the portal; and another given host request may be, for example, a request directed to accessing the data register, and this request is redirected to the register address that is specified by the index register. The programmable host firewall interface 170 may, in accordance with example implementations, be programmed with firewall rules for index and data registers and be programmed with firewall rules for registers behind index and data registers. In accordance with example implementations, the programmable host firewall interface 170 passes, or allows, accesses to index and data registers so that a second set of firewall rules and associated matching criteria may be applied for each accessible register bank.

In accordance with example implementations, a firewall rule contains one of the following actions, which controls processing of the host request by the register access logic 260: a pass, or allow action; a drop, or deny action; and a modify action. The allow action allows the register access logic 260 to process the host request without modification, i.e., the allow action allows the logic 260 to perform the write or read in accordance with the host request.

The deny action causes the register access logic 260 to proceed with processing the host request but provide dummy data or a dummy response in response to the host request. For example, for a host request for a write, the deny action may result in the register access logic 260 accepting the transaction but not changing the content of the targeted register 164. For a host request for a read, the deny action may result in the register access logic 260 returning a value (i.e., dummy data) that is unrelated to the content of the targeted register or register field, i.e., the returned data does not reflect any previous writes to the targeted register. For example, in accordance with some implementations, the deny action for a read results in a predetermined value, such as all zeros, being returned. It is noted that all zeros may be a "safe" value to return, as other nonzero values may be more confusing to software. In accordance with example implementations, denying a host request may involve not reporting an error on the host interface 160, because such an error may result in a system crash or other unintended result.

In accordance with example implementations, the modify action causes the register access logic 260 to modify the action that is requested by the host. For example, the modify action may remap registers, so that a host request that targets register A proceeds with accessing register B instead of register A. In accordance with example implementations, a modify action may be to swap a register 164 to another register 164 (e.g., relocate COM1, COM2 and/or COM3 Universal Asynchronous Receiver/Transmitter (UART) registers).

The modify action may, in accordance with example implementations, remap a register 164 to a generic software-defined register 290 that is serviced by the BMC processor 154. Depending on the particular implementation, one of many different variations of remapping software defined registers 290 may be used. For example, for a read-only software-defined register 290, the modify action may be, as an example, an action to discard writes from the host 104 and accept reads from the host 104. Such a modify action may have a relatively minimal latency impact on accesses to the read-only software-defined register 290.

As another example, for a read-write software-defined register 290, the modify action may be to accept writes and reads from the host 104. Moreover, an interrupt may be generated to notify the BMC processor 154 when a host write occurs, which has a relatively minimal latency impact. A potential challenge with this approach is that the BMC processor 154 may be burdened with keeping up with all of the host writes.

As another example, in accordance with some implementations, the BMC processor 154 may handle all writes and reads to software-defined registers 290. For example, an interrupt may be generated upon reads to notify the BMC processor 154 to provide the read data in response to the host request. Moreover, the BMC processor 154 may receive an interrupt in response to writes for purposes of the BMC processor 154 determining how to handle the processing of the writes.

There may be more than one firewall rule hit, or match, for a given host request. As such, multiple firewall rules, or "overlapping" firewall rules, may be identified for a given host request. For example, a set of firewall rules may have all of their associated matching criteria in common, except for different address ranges; and the address ranges may overlap, so that a given host request may target a register 164 that has an address that falls within the scope of the overlapping address ranges.

The programmable host firewall interface 170 may process overlapping firewall rules sequentially or in parallel, in accordance with example implementations. The sequential processing of overlapping firewall rules has the benefit of allowing the specification of a mixture of relatively broad and relatively narrow firewall rules having wildcard-based matching criteria.

In accordance with example implementations, the programmable host firewall interface 170 may be programmed with a list of firewall rules. The list is ordered so that the list defines the sequential order in which the firewall rules of the list are processed. For example, the programmable host firewall interface 170 may be programmed with the following list of firewall rules (where the prefix "0x" represents a hexadecimal notation):

Firewall Rule 1: allow all I/O addresses 0x00-0xFFFF;
Firewall Rule 2: deny I/O addresses 0x40-0x80;
Firewall Rule 3: allow I/O address 0x60; and
Firewall Rule 4: allow I/O address 0x64.

The sequential order for this example list is the order in which the firewall rules appear above. In other words, for this example, the programmable host firewall interface 170 processes Firewall Rule 1 first, then processes Firewall Rule 2, then processes Firewall Rule 3 and then processes Firewall Rule 4. Processing a given firewall rule may or may not invoking the action of the rule, depending on whether the matching address criterion of the firewall rule is a hit. Therefore, the allow action that is set forth in Firewall Rule 1 (for a hit) is applied first, the deny action that is set forth in Firewall Rule 2 (for a hit) is applied next, the allow action that is set forth in Firewall Rule 3 (if a hit) is applied next, and the allow action that is set forth in Firewall Rule 4 (if a hit) is applied last.

Continuing this example, one or more of the firewall rules above may apply to a given host request, and as such, these firewall rules are overlapping. For example, Firewall Rules 1 and 2 are hits for a host request that targets I/O address 0x40. Accordingly, for this host request, the programmable host firewall interface 170 first applies the allow action of Firewall Rule 1 and then applies the deny action of Firewall Rule 2, i.e., at the end of the sequential processing of the overlapping Firewall Rules 1 and 2, the interface 170 denies the host request.

Thus, the programmable host firewall interface 170 may, in accordance with example implementations, sequentially process each firewall rule of a sequentially ordered list of firewall rules to, for each rule, determine whether a hit has occurred and if so, apply the action of the rule.

In accordance with example implementations, the number of sequentially-ordered firewall rules may be variable (as the number depends on the programming), and as such, a variable number of clock cycles may be consumed to perform the sequential progression through the firewall rules. The overall number of firewall rules of the list may, in accordance with example implementations, have a specified upper limit, which may, for example, be set based on the size of the region of the memory 280 in which data representing the firewall rules are stored. In accordance with some implementations, the upper limit for the number of firewall rules of the list may be relatively small (e.g., four firewall rules), which limits the rules to a manageable number.

In accordance with some implementations, the programmable host firewall interface 170 may process firewall rules in parallel. The parallel processing of firewall rules is, in accordance with example implementations, associated with a particular policy regarding how overlapping firewall rules are handled. As an example, in accordance with some implementations, the policy for handling the parallel processing of overlapping firewall rules may be one of the following: the most permissive rule is applied (e.g., the allow action would take precedence over other actions); the most restrictive rule is applied (e.g., a deny action would take precedence over other actions); or any overlapping rule is applied (e.g., the programmable host firewall interface 170 may determine, based on some criteria other than which firewall rule is the most or least restrictive, which of the overlapping firewall rules is selected).

As an example of the firewall rules and the corresponding firewall rule data 282, each firewall rule may have one of two actions: an allow action or a deny action. Moreover, for this example, the sole criterion for determining or identifying a firewall hit is the register address. For this set of firewall rules, a single bit may be used to store a value (e.g., a bit of "1" to allow and a bit of "0" to deny) representing the action; and the bits may be part of an array of bits, such that the bit position corresponds to a particular register address. With such a scheme, a relatively small amount of storage may be used for the firewall rule data 282. For example, 3960 bytes of registers would equal 990 DWORDs. With one bit per DWORD, this means 990 bits, or 123 bytes, may be used to store the firewall rules for the registers 164. For a relatively small quantity of firewall rules, the storage (i.e., the memory 280) for the firewall rules may be implemented using flip-flops; or for a larger number of firewall rules, the storage may be implemented using a memory (e.g., a static random access (SRAM)). It is noted that for these example firewall rules, none of the rules overlap, in that each register address has single corresponding firewall rule (i.e., a rule to control whether access is denied or allowed).

As another example of the firewall rules and the corresponding data 282 describing the rules, the firewall rule data 282 may be stored in a data structure (e.g., a table). Each entry (e.g., a table row) of the data structure may correspond to a particular firewall rule, and each entry may contain fields (e.g., columns) describing matching criteria (e.g., an address space, an address field, an access type, an access size, or some combination of these criteria) and an action for the firewall rule. It is noted that for this example, for a given register address, the data structure may have multiple entries, which may result in overlapping firewall rules. If these example firewall rules are to be sequentially processed rules, then, in accordance with example implementations, the data structure may indicate the sequential ordering. For example, the entries may be ordered in the data structure to correspond to the sequential processing order.

Figure 3:
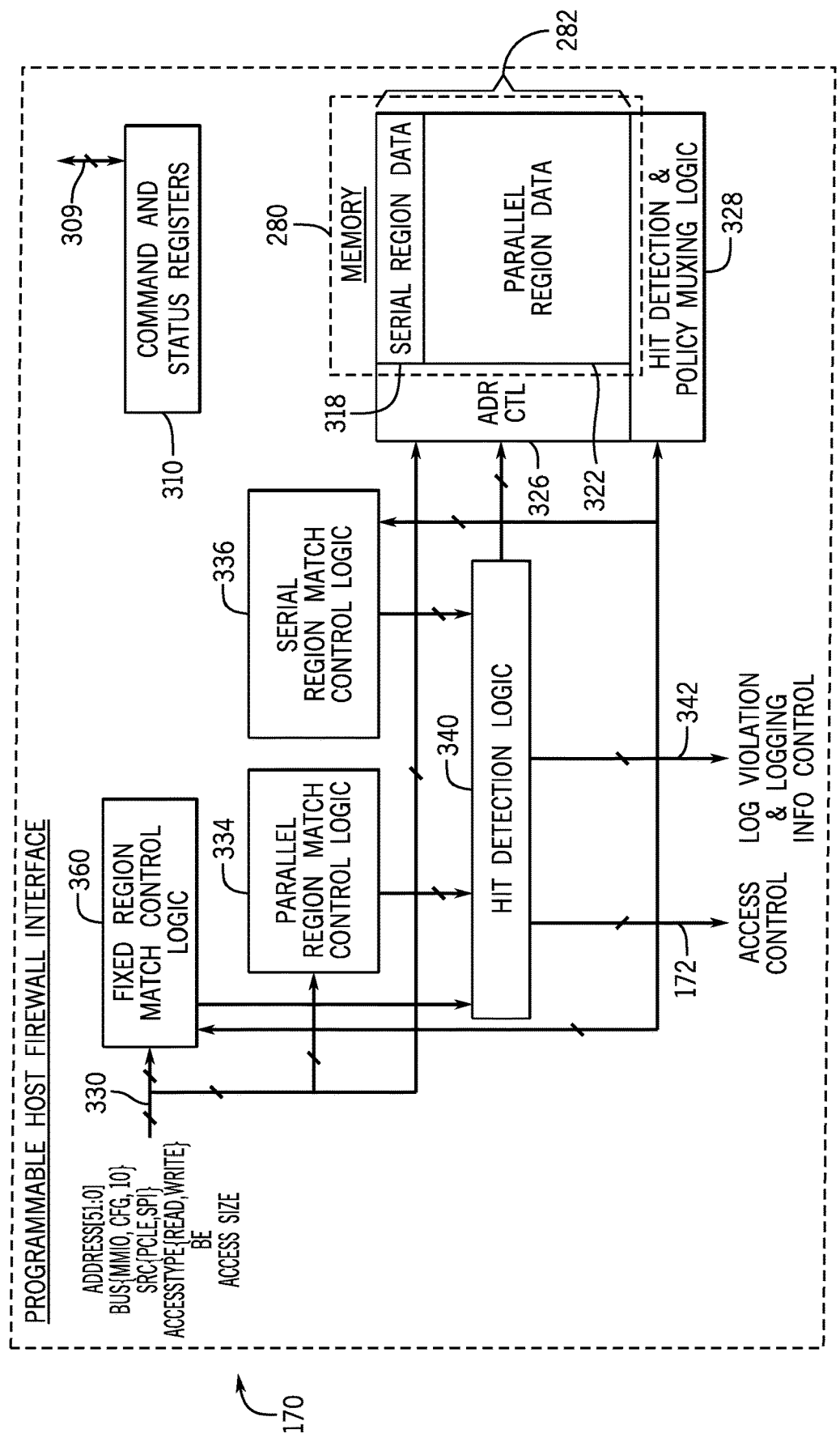
FIG. 3 is a schematic diagram of a programmable host firewall interface of the BMC of FIG. 2 according to an example implementation.

Referring to FIG. 3 in conjunction with FIG. 2, in accordance with some implementations, the programmable host firewall interface 170 includes communication lines 330, which communicate bits of data representing features of a particular host request that is received from a host interface 160. For example, in accordance with some implementations, the communication lines 330 may communicate bits representing features of a host request for purposes of the programmable host firewall interface 170 determining whether these features match the matching criterion or matching criteria of a corresponding firewall rule.

As depicted in FIG. 3, in accordance with some implementations, the programmable host firewall interface 170 includes parallel region match control logic 334 that communicates with hit detection and policy multiplexing logic 328 for purposes of determining whether a hit to one or multiple firewall rules has occurred. The logic 328 may, in accordance with example implementations, base the hit detection on parallel region data 322 that is stored in the memory 280. The parallel region data 322 may be organized in any of a number of different forms or data structures, depending on the particular implementation, such as the examples that are set forth herein as well as other data structures.

The parallel region match control logic 334 may, based on features of a host request and the parallel region data 322, determine that multiple firewall rules have been matched to the host request. In other words, in accordance with example implementations, multiple overlapping firewall rules may be matched to a given request. When this occurs, the parallel region match control logic 334 may apply a predetermined policy (e.g., a policy to select the most permissive rule, a policy to select the most restrictive rule, or other policy) to select a given firewall rule of the overlapping firewall rules to be applied to the processing of the host request. Hit detection logic 340 may then, based on the selection of the particular overlapping rule, generate the signal(s) 172 for purposes of controlling how the register access logic 260 processes the host request. Moreover, in accordance with some implementations, the hit detection logic 340 may provide additional data, via communication lines 342, representing particular violations so that these violations may be logged.

In addition to the parallel region match control logic 334 or in substitution thereof, in accordance with some implementations, the programmable host firewall interface 170 includes serial region match control logic 336, which may sequentially apply a set of firewall rules that are represented by serial region data 318 that is stored in the memory 280. The serial region data 318 represents an ordered list of firewall rules; and in accordance with example implementations, the serial region match control logic 336 processes the firewall rules in accordance with this ordering.

In accordance with some implementations, the programmable host firewall interface 170 includes the parallel region match control logic 334 and the serial region match control logic 336; and in accordance with some implementations, the programmable host firewall interface 170 may be programmed to either sequentially apply firewall rules (via the logic 336) or consider firewall rules in parallel (via the logic 334). In accordance with further example implementations, the programmable host firewall interface 170 may be programmed to first process a list of firewall rules sequentially (using the logic 336) and then process another set of firewall rules in parallel (via the logic 334). As such, many variations are contemplated, which are within the scope of the appended claims.

As depicted in FIG. 3, among its other features, in accordance with some implementations, the programmable host firewall interface 170 may include fixed region match control logic 360, which is a non-programmable portion of the programmable host firewall interface 170 and which may be used to identify certain fixed, or non-modifiable, firewall rules. As also depicted in FIG. 3, in accordance with example implementations, the BMC processor 154, via the firewall interface programming engine 272, may program the programmable host firewall interface 170, as described herein, via command status register control logic 310 by communicating over an internal channel 309 that is accessible only by the BMC processor 154.

Figure 4:
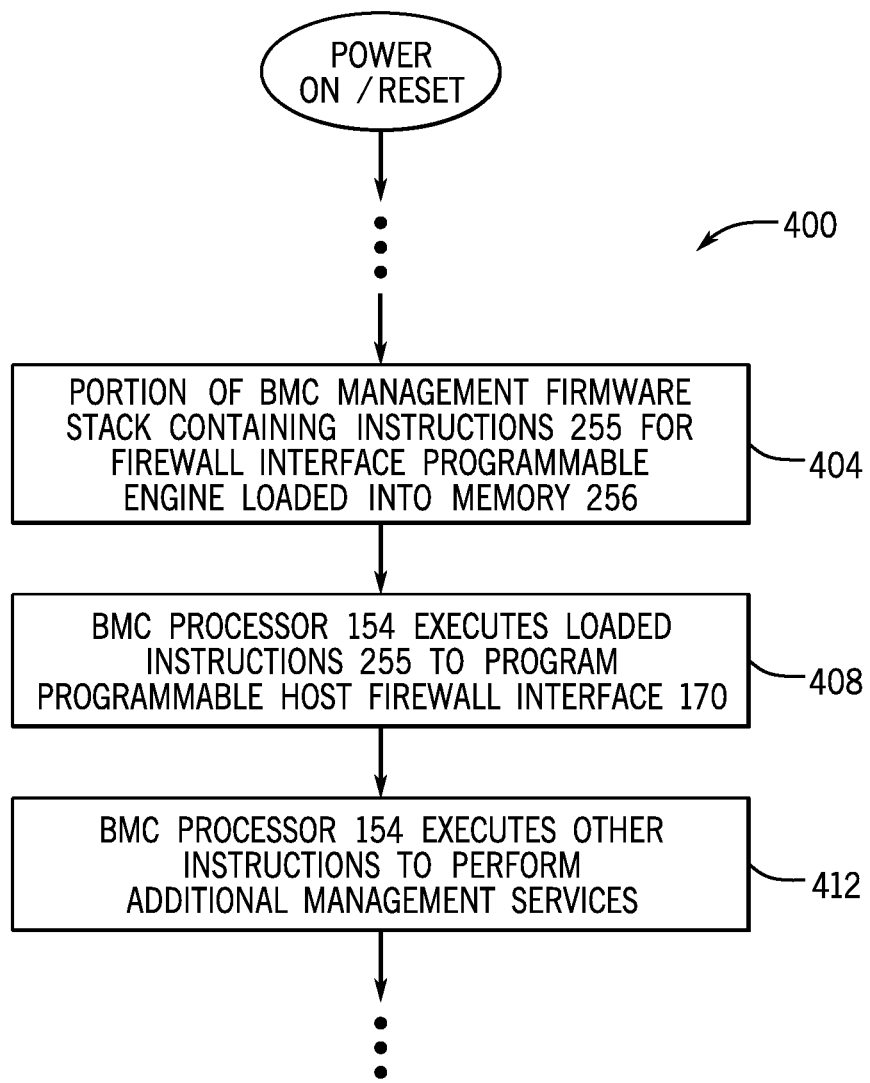
FIG. 4 is a flow diagram depicting a portion of a boot process performed by the BMC to program the programmable host firewall interface according to an example implementation.

Referring to FIG. 4 in conjunction with FIGS. 1 and 2, in accordance with example implementations, a process 400 may be performed in conjunction with a boot of the computer system 100 for purposes of programming the programmable host firewall interface 170. The process 400 includes the BMC management firmware stack, which contains instructions for the firewall interface programming engine 272, being loaded into the memory 256, pursuant to block 404. Pursuant to block 408, the BMC processor 154 executes the loaded instructions to program the programmable host firewall interface 170, i.e., the BMC processor 154 executes the instructions to form the engine 272 that programs the firewall interface 170. The BMC processor 154 then proceeds, pursuant to block 412, to execute other instructions to perform additional management services for the computer system 100.

Figure 5:
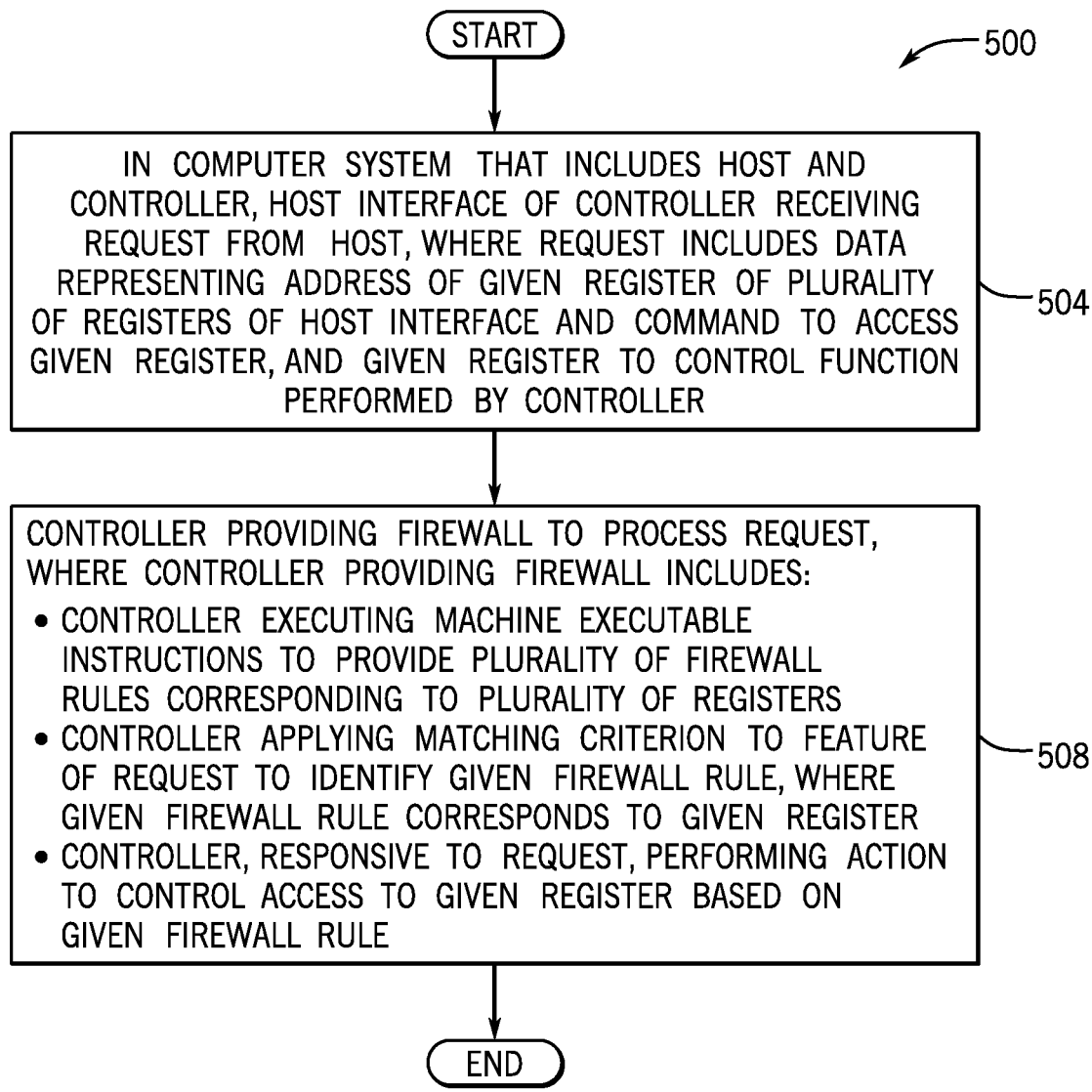
FIG. 5 is a flow diagram depicting a process to provide a firewall interface for a controller according to an example implementation.

Referring to FIG. 5, in accordance with example implementations, a process 500 includes, in a computer system that includes a host and a controller, a host interface of the controller receiving (block 504) a request from the host. The request includes data, which represents an address of a given register of a plurality of registers of the host interface and command to access the given register. The given register is to control a function that is performed by the controller. The process 500 includes the controller providing (block 508) a firewall to process the request. The controller providing the firewall includes the controller executing machine-executable instructions to provide a plurality of firewall rules corresponding to the plurality of registers; and the controller applying a matching criterion to a feature of the request to identify a given firewall rule of the plurality of firewall rules. The given firewall rule corresponds to the given register. The controller providing the firewall includes the controller, responsive to the request, performing an action to control access to the given register based on the given firewall rule.

Figure 6:
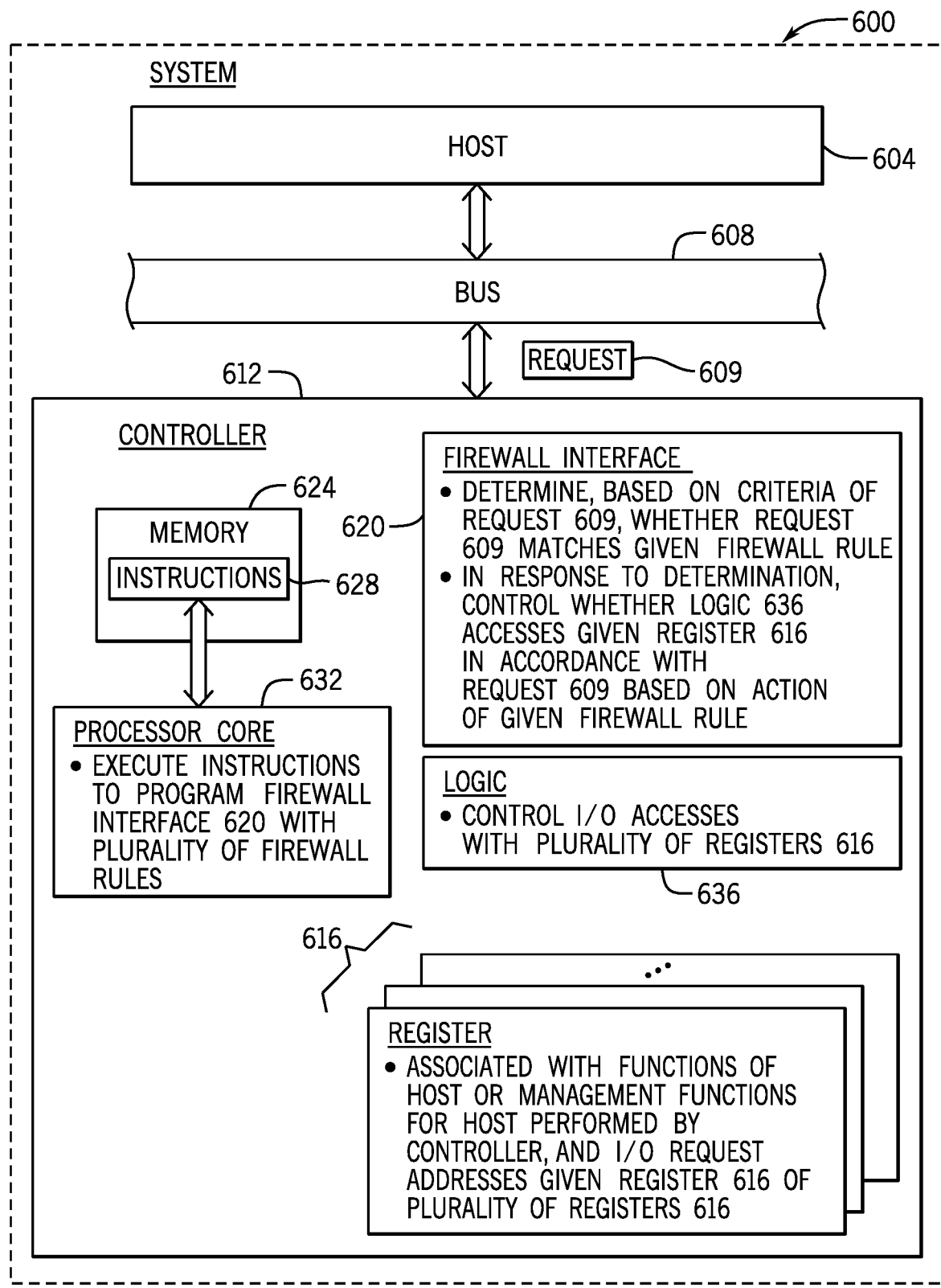
FIG. 6 is a schematic diagram of a computer system having a programmable firewall interface according to an example implementation.

Referring to FIG. 6, in accordance with example implementations, a system 600 includes a bus 608; a host 604; and a controller 612. The host to cause an input/output (I/O) request 609 to be communicated via the bus 608. The controller includes a plurality of registers 616; logic 636; a firewall interface 620, which is coupled to the bus 608; a memory 624 to store instructions 628; and a processing core 632. The registers 616 are associated with functions of the host 604 or management functions for the host 604 performed by the controller 612; and the I/O request addresses a given register 616 of the plurality of registers 616. The processing core 632 is to execute the instructions 628 to program the firewall interface 620 with a plurality of firewall rules. The firewall interface 620 is to, determine, based on criteria of the request 609, whether the request 609 matches a given firewall rule of the plurality of firewall rules; and in response to the determination, control whether the logic 636 accesses the given register 616 in accordance with the request 609 based on an action of the given firewall rule.

Figure 7:
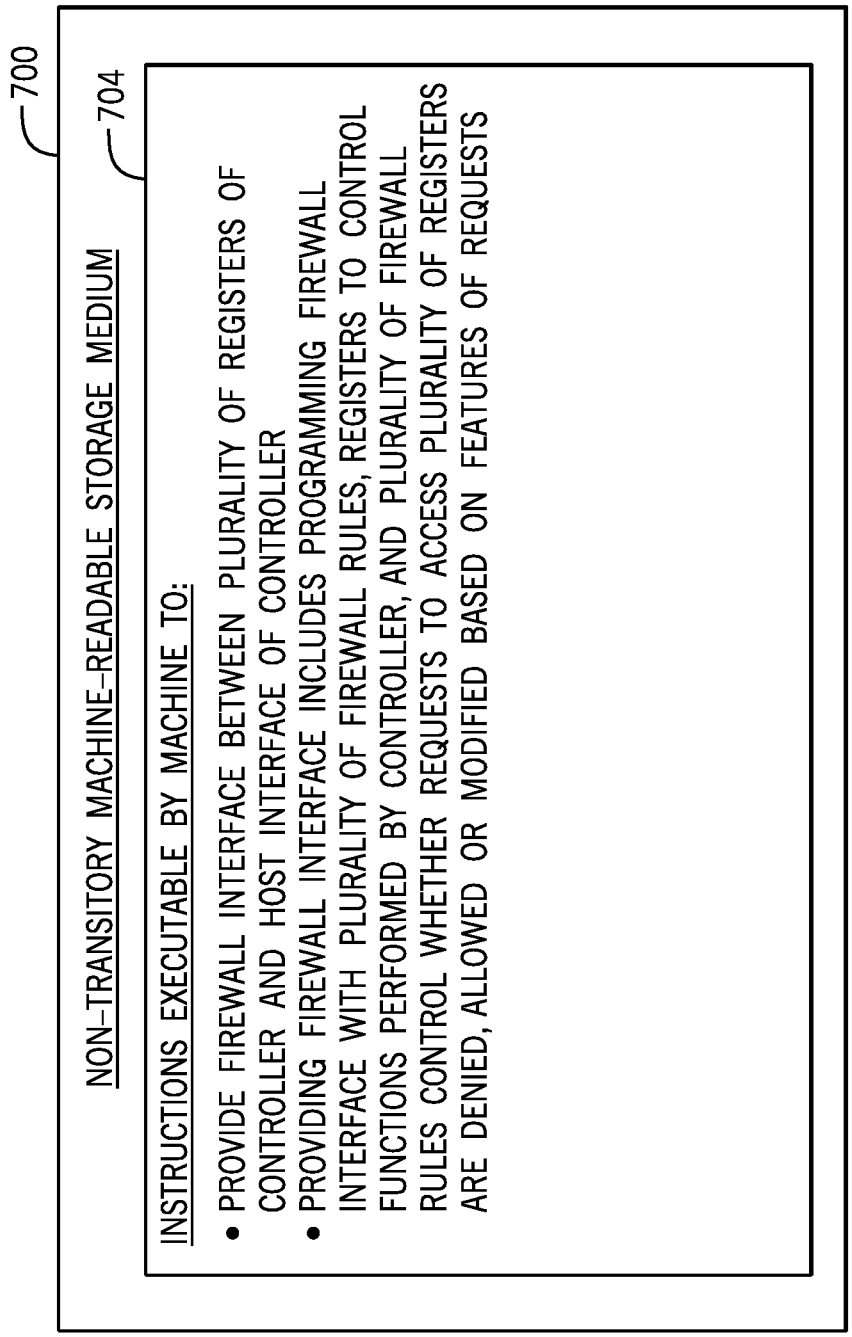
FIG. 7 is an illustration of machine-executable instructions stored on a non-transitory storage medium that, when executed, cause a machine to program a firewall interface according to an example implementation.

Referring to FIG. 7, in accordance with example implementations, a non-transitory machine-readable storage medium 700 stores instructions 704 that, when executed by the machine, cause the machine to provide a firewall interface between a plurality of registers of a controller and a host interface of the controller. Providing the firewall interface includes programming the firewall interface with a plurality of firewall rules. The registers are to control functions that are performed by the controller; and the plurality of firewall rules control whether requests to access the plurality of registers are denied, allowed or modified based on features of the request.

In accordance with an example implementation, applying the matching criterion includes identifying the given firewall rule based on at least one of the address and an address space type, and an access type or an access size. The use of different matching criterion, such as address, address space type, and an access type and/or an access size is advantageous to allow specific firewall rules to be tailored to specific features of host requests.

In accordance with an example implementation, the request includes a packet that includes a plurality of fields, and the process further includes the controller identifying the given firewall rule based on content and at least one field of the plurality of fields. The plurality of fields includes: a first field containing data representing an address space type of the given register; a second field containing data representing the address; a third field containing data representing an access type; and a fourth field containing data representing an access size. A particular advantage is that firewall rules may be specifically tailored to packet features.

In accordance with an example implementation, identify the given firewall rule may further include identifying the given firewall rule based on content in multiple fields of the plurality of fields. A particular advantage is that firewall rules may be specifically tailored to packet features.

In accordance with an example implementation, the plurality of registers includes an index register, a data register, and a set of registers behind the index register and the data register. The given register includes the index register, the command includes a command to write to the index register, and the request further includes write data specifying a register of the set of registers; or the given register includes the data register, the command includes a command to access the data register, and the access to the data register to be redirected to a register of the set of registers based on content that is stored in the index register. A particular advantage is that accesses to may be controlled to many different types of registers.

In accordance with an example implementation, performing the action includes denying the request, where denying the request includes one of ignoring a write request to the given register or responding to a read request of the given register with data unrelated to a content stored in the given register. A particular advantage is that firewall rules may be specifically tailored to packet features.

In accordance with an example implementation, performing the action includes modifying the request, where modifying the request includes changing the address. A particular advantage is that firewall rules may be specifically tailored to packet features.

In accordance with an example implementation, the given register may include a software-defined register. A particular advantage is that firewall rules may be specifically tailored to packet features.

In accordance with an example implementation, the controller may apply matching criteria including the matching criterion to a plurality of features of the request to identify a plurality of overlapping firewall rules. The plurality of overlapping firewall rules the given firewall rule. The process may include the controller sequentially applying the overlapping firewall rules to control the access to the given register. A particular advantage is that a mixture of broad and narrow firewall rules may be specified using wildcards.

In accordance with an example implementation, the controller may apply matching criteria including the matching criterion to a plurality of features of the request to identify a plurality of overlapping firewall rules. The plurality of overlapping firewall rules may include the given firewall rule. The process may include the controller selecting the given firewall rule from the plurality of overlapping firewall rules based on a rule selection criterion. A particular advantage is that the processing of overlapping firewall rules may be performed in a fewer number of clock cycles.

In accordance with an example implementation, the host interface receiving the request includes the host interface communicating with a bus to receive the bus. The bus may be a Peripheral Component Interconnect Express (PCIe) bus, a Low Pin Count (LPC) bus, a Serial Peripheral Interface (SPI) bus or an Enhanced SPI (eSPI) bus. A particular advantage is that firewall rules may be specifically tailored to different bus standards.

In accordance with an example implementation, the controller may be a BMC, a storage controller or a network interface controller. A particular advantage is that a host firewall interface may be implanted in a wide variety of different controllers.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
in a computer system comprising a host and a controller, a host interface of the controller receiving a request from the host, wherein the request comprises data representing an address of a given register of a plurality of registers of the host interface and a command to access the given register, and the given register to control a function performed by the controller; and
the controller providing a firewall to process the request, wherein the controller providing the firewall comprises:
the controller executing machine executable instructions to provide a plurality of firewall rules corresponding to the plurality of registers;
the controller applying a matching criterion to a feature of the request to identify a given firewall rule of the plurality of firewall rules, wherein the given firewall rule corresponds to the given register; and
the controller, responsive to the request, performing an action to control access to the given register based on the given firewall rule,
wherein applying the matching criterion comprises identifying the given firewall rule based on at least one of the address, an address space type, an access type or an access size,
wherein the request comprises a packet comprising a plurality of fields, the method further comprising:
the controller identifying the given firewall rule based on content in at least one field of the plurality of fields, wherein the plurality of fields comprises:
a first field containing data representing an address space type of the given register:
a second field containing data representing the address;
a third field containing data representing an access type; and
a fourth field containing data representing an access size.

2. The method of claim 1, wherein identifying the given firewall rule further comprises identifying the given firewall rule based on content in multiple fields of the plurality of fields.

3. The method of claim 1, wherein performing the action comprises one of allowing the request to proceed, denying the request, or modifying the request.

4. A method comprising:
in a computer system comprising a host and a controller, a host interface of the controller receiving a request from the host, wherein the request comprises data representing an address of a given register of a plurality of registers of the host interface and a command to access the given register, and the given register to control a function performed by the controller; and the controller providing a firewall to process the request, wherein the controller providing the firewall comprises:

the controller executing machine executable instructions to provide a plurality of firewall rules corresponding to the plurality of registers;

the controller applying a matching criterion to a feature of the request to identify a given firewall rule of the plurality of firewall rules, wherein the given firewall rule corresponds to the given register; and the controller, responsive to the request, performing an action to control access to the given register based on the given firewall rule, wherein the plurality of registers comprises an index register, a data register, and a set registers behind the index register and the data register; and wherein:

the given register comprises the index register, the command comprises a command to write to the index register, and the request further comprises write data specifying a register of the set of registers; or the given register comprises the data register, the command comprises a command to access the data register, and the access to the data register to be redirected to a register of the set of registers based on content stored in the index register.

5. The method of claim 1, wherein:
performing the action comprises denying the request, wherein denying the request comprises one of ignoring a write request to the given register or responding to a read request to the given register with data unrelated to a content stored in the given register.

6. The method of claim 1, wherein:
performing the action comprises modifying the request, wherein modifying the request comprises changing the address.

7. The method of claim 1, further comprising:
the controller applying matching criteria including the matching criterion to a plurality of features of the request to identify a plurality of overlapping firewall rules, wherein the plurality of overlapping firewall rules includes the given firewall rule; and the controller sequentially applying the overlapping firewall rules to control the access to the given register.

8. The method of claim 1, further comprising:
the controller applying matching criteria including the matching criterion to a plurality of features of the request to identify a plurality of overlapping firewall rules, wherein the plurality of overlapping firewall rules includes the given firewall rule; and the controller selecting the given firewall rule from the plurality of overlapping firewall rules based on a rule selection criterion.

9. The method of claim 1, wherein the host interface receiving the request comprises the host interface communicating with a bus to receive the request, wherein the bus comprises a Peripheral Component Interconnect Express (PCIe) bus, a Low Pin Count (LPC) bus, a Serial Peripheral Interface (SPI) bus or an Enhanced SPI (eSPI) bus.

10. The method of claim 1, wherein the controller comprises a baseboard management controller, a storage controller or a network interface controller.

11. A system comprising:
a bus;
a host to cause an input/output (I/O) request to be communicated via the bus; and
a baseboard management controller comprising:
a management plane and a security plane isolated from the management plane;
a plurality of registers, wherein the registers are associated with functions of the host or management functions for the host performed by the controller, and the I/O request addresses a given register of the plurality of registers;
logic to perform I/O accesses with the plurality of registers;
a firewall interface coupled to the bus;
a memory to store instructions; and
a processing core that is part of the management plane to execute the instructions to program the firewall interface with a plurality of firewall rules,
wherein the firewall interface to:
determine, based on criteria of the request, whether the request matches a given firewall rule of the plurality of firewall rules; and
in response to the determination, control whether the logic accesses the given register in accordance with the request based on an action of the given firewall rule.

12. The system of claim 11, wherein:
the request is associated with a packet comprising a plurality of fields; and
the firewall interface to identify the given firewall rule based on content contained in at least one field of the plurality of fields.

13. The system of claim 11, wherein the engine to further, based on the given firewall rule, control the logic to deny, allow or modify the request.

14. A non-transitory machine-readable storage medium to store instructions that, when executed by a machine, cause the machine to:
provide a firewall interface between a plurality of registers of a controller and a host interface of the controller, wherein providing the firewall interface comprises programming the firewall interface with a plurality of firewall rules, the registers to control functions performed by the controller, and the plurality of firewall rules control whether requests to access the plurality of registers are denied, allowed or modified based on features of the requests;
program the firewall interface with a first subset of firewall rules of the plurality of firewall rules to apply in parallel in response to at least one first criterion matching at least one first feature of a given request of the requests; and
program the firewall interface with a second subset of firewall rules of the plurality of the plurality of rules to apply sequentially in response to at least one second criterion matching at least one second feature of the given request.

15. The storage medium of claim 14, wherein the controller comprises a baseboard management controller, a storage controller, or a network interface controller.

* * * * *